US012040992B2

(12) United States Patent
Nishiguchi et al.

(10) Patent No.: US 12,040,992 B2
(45) Date of Patent: Jul. 16, 2024

(54) CONTROL DEVICE, CONTROL METHOD, AND CONTROL PROGRAM

(71) Applicant: Nippon Telegraph and Telephone Corporation, Tokyo (JP)

(72) Inventors: Masato Nishiguchi, Musashino (JP); Hiroki Iwahashi, Musashino (JP); Takahiro Shibata, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/023,974

(22) PCT Filed: Aug. 31, 2020

(86) PCT No.: PCT/JP2020/032953
§ 371 (c)(1),
(2) Date: Feb. 28, 2023

(87) PCT Pub. No.: WO2022/044339
PCT Pub. Date: Mar. 3, 2022

(65) Prior Publication Data
US 2023/0328004 A1    Oct. 12, 2023

(51) Int. Cl.
*H04L 47/765* (2022.01)
*H04L 47/80* (2022.01)

(52) U.S. Cl.
CPC .......... *H04L 47/765* (2013.01); *H04L 47/808* (2013.01)

(58) Field of Classification Search
CPC ....... H04L 47/808; H04L 41/50; H04L 47/70; H04L 47/80; H04L 47/824; H04L 47/765; H04W 28/16
See application file for complete search history.

(56) References Cited

U.S. PATENT DOCUMENTS

| | | | | |
|---|---|---|---|---|
| 6,636,513 B1 * | 10/2003 | Nishikawa | .............. | H04L 12/56 370/398 |
| 2003/0074443 A1 * | 4/2003 | Melaku | ................. | H04L 47/829 709/224 |
| 2009/0316600 A1 | 12/2009 | Yumoto et al. | | |
| 2013/0130642 A1 * | 5/2013 | Joul | .................... | H04L 41/5029 455/406 |
| 2022/0141847 A1 * | 5/2022 | Kurita | ................. | H04W 72/535 370/329 |
| 2023/0328004 A1 * | 10/2023 | Nishiguchi | ........... | H04L 47/808 709/226 |

FOREIGN PATENT DOCUMENTS

JP     2010004426      1/2010
WO    WO 2018173292   9/2018

OTHER PUBLICATIONS

Iwahashi et al., "Consideration of Flexible User Accommodation on Edge Router," The Institute of Electronics, Information and Communication Engineers 2020 Society Conference, Mar. 3, 2020, 3 pages (with English Translation).

* cited by examiner

*Primary Examiner* — David R Lazaro
(74) *Attorney, Agent, or Firm* — Fish & Richardson P.C.

(57) ABSTRACT

A management device includes: a reception unit that receives a change request for changing an allocated resource of a user who uses a communication line, from a manager of the communication line, a server managing information related to a use terminal of the communication line, or the user; and a change unit that changes the allocated resource of the user by using a predetermined change method when the reception unit receives the change request.

9 Claims, 8 Drawing Sheets

| USER IDENTIFIER | USER ATTRIBUTES | BILLING AMOUNT (THE NUMBER OF CONTRACT SERVICES) | CONTRACT YEARS | TYPE OF COMMUNICATION | COMMUNICATION TIME | COMMUNICATION VOLUME BY TIME ZONE |
|---|---|---|---|---|---|---|
| | | USER CONTRACT INFORMATION ACQUISITION UNIT ACQUIRES FROM HIGH-ORDER Ops | | USER COMMUNICATION STATISTICAL INFORMATION COLLECTION UNIT COLLECTS BY TELEMETRY OR THE LIKE | | |
| 1 | PREMIUM | 5000 YEN | ONE MONTH | MOVING IMAGE | 1 HOUR | 10M |
| 2 | GENERAL | 100000 YEN | 10 YEARS | IoT | 30 SECONDS | 1M |
| ... | | | | | | |

CONTROL DEVICE, CONTROL METHOD, AND CONTROL PROGRAM

CROSS-REFERENCE TO RELATED APPLICATIONS

This application is a National Stage application under 35 U.S.C. § 371 of International Application No. PCT/JP2020/032953, having an International Filing Date of Aug. 31, 2020, the disclosure of which is considered part of the disclosure of this application, and is incorporated by reference in its entirety into this application.

TECHNICAL FIELD

The present invention relates to a management device, a management method, and a management program.

BACKGROUND ART

Conventionally, in a communication line, a centralized management server (management device) is configured to select a communication device of an appropriate accommodation destination and a LAG (Link Aggregation Group) port on the basis of a policy of resource allocation determined in a network design stage, inputs a configuration, and accommodates the user. In the event of maintenance work for the convenience of a communication carrier or a failure in a communication device, the centralized management server changes the accommodation position of the accommodated user in units of devices, LAG ports constituting a device, or users. In any case, the resources secured for the user become static ones determined at the time of application for a service, maintenance, failure, and the like.

CITATION LIST

Non Patent Literature

[NPL 1] Iwahashi et al. "Study of flexible user accommodation method in edge router," IEICE, General Conference 2020, B-6-58, March 2020

SUMMARY OF INVENTION

Technical Problem

However, in the prior art, the resources allocated to users cannot be changed flexibly and on-demand. More specifically, in the prior art, since resources are secured in units of lines, flexible resources cannot be allocated in accordance with information on the terminal to be used (the number of pieces of information and attributes of the information). For example, when another network is overlaid on the contract line, it is not possible to dynamically secure resources in response to changes in the information of the terminals used that belong to the overlaid network.

In addition, in the prior art, it is not possible to control the communication device on-demand and change resources allocated to users, due to reports from users or the status of user communications known by the network side. For example, even when resource enhancement is required when the number of terminals used is increased or when the band consumption is large, or even when the communication state is deteriorated due to resource compression by another line, on-demand resource enhancement cannot be performed.

Solution to Problem

In order to solve the foregoing problems, the present invention includes: a reception unit that receives a change request for changing an allocated resource of a user who uses a communication line, from a manager of the communication line, a server managing information related to a use terminal of the communication line, or the user; and a change unit that changes the allocated resource of the user by using a predetermined change method when the reception unit receives the change request.

Advantageous Effects of Invention

The present invention can change, flexibly and on-demand, resources allocated to users in a communication line.

DESCRIPTION OF EMBODIMENTS

Hereinafter, a management device, a management method, and a management program according to the present application will be described in detail with reference to the drawings. Note that the present invention is not limited by the embodiments described below.

First Embodiment

Hereinafter, a configuration of the management device according to the present embodiment, change processing for changing allocated resources, scoring processing, and a flow of management processing are sequentially described, and the effects of the present embodiment will be described at the end.

Configuration of Management Device

Figure 1:
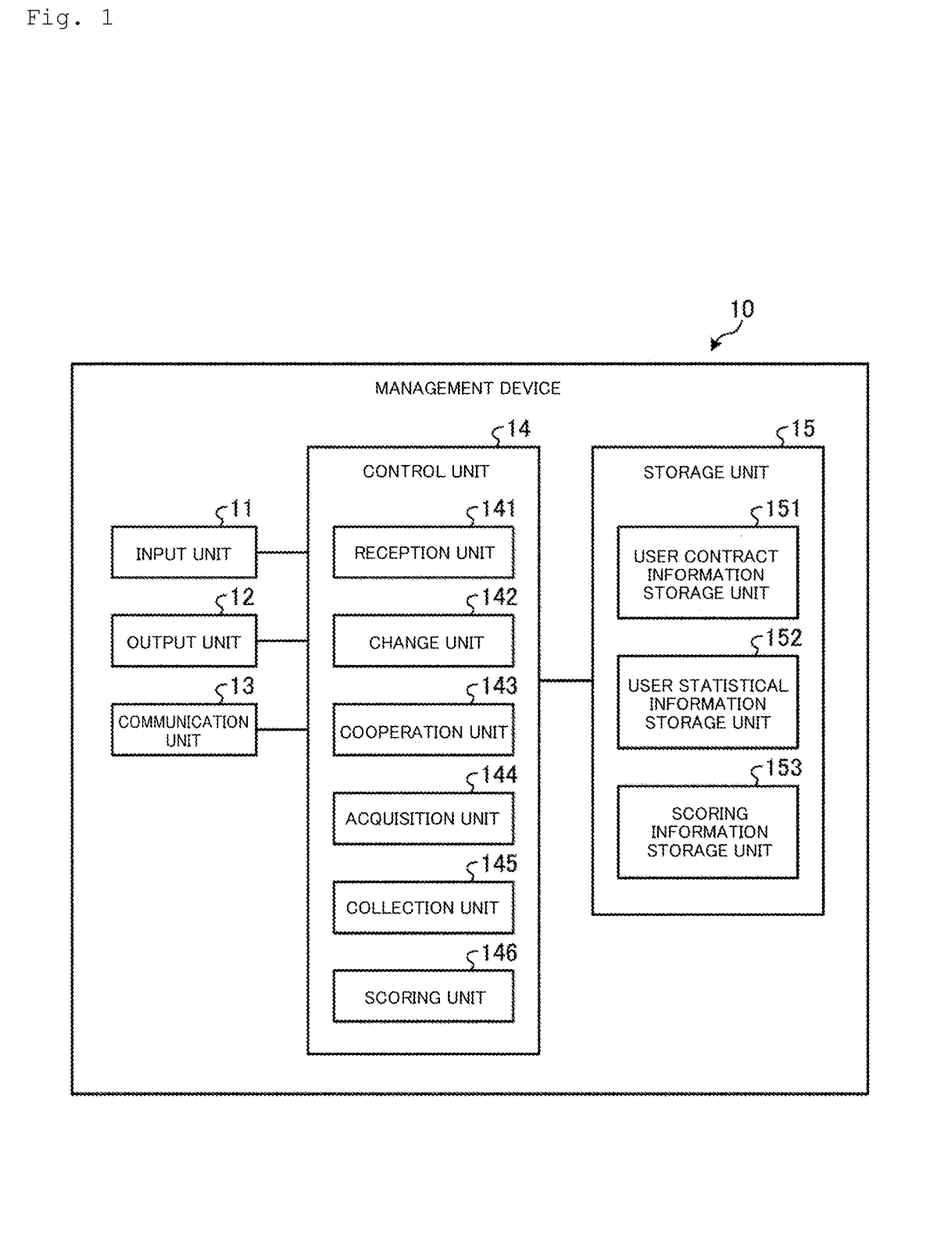
FIG. 1 is a block diagram showing a configuration example of a management device according to a first embodiment.

The configuration of a training 10 according to the present embodiment will be described with reference to FIG. 1. FIG. 1 is a block diagram showing a configuration example of the management device according to the first embodiment. The management device 10 includes an input unit 11, an output unit 12, a communication unit 13, and a control unit 14.

The input unit 11 controls input of various types of information into the management device 10. For example, the input unit 11 is composed of, for example, an input device such as a touch panel, a voice input device, a keyboard, or a mouse. The output unit 12 controls output of various types of information from the management device 10. The output unit 12 is composed of, for example, a display device such as a liquid crystal display, a printing device such as a printer, an information communication device or the like.

The communication unit 13 controls data communication with another device. For example, the communication unit 13 performs data communication with each communication device. The communication unit 13 can also perform data communication with a terminal of an operator, not shown.

The control unit 14 controls the entire management device 10. The control unit 14 includes a reception unit 141, a change unit 142, a cooperation unit 143, an acquisition unit 144, a collection unit 145, and a scoring unit 146. Here, the control unit 14 is, for example, an electronic circuit such as a CPU (Central Processing Unit) or an MPU (Micro Processing Unit), an integrated circuit such as an ASIC (Application Specific Integrated Circuit) or an FPGA (Field Programmable Gate Array), or the like.

The reception unit 141 receives a change request for changing an allocated resource of a user who uses the communication line, from a manager of a communication line, a server managing information related to a use terminal of the communication line, or the user. For example, the reception unit 141 receives a change request for changing an allocated resource of a user, from the user who uses the communication line, when resource enhancement is requested at the time when the number of terminals used is increased or when the band consumption is large. When the communication state is deteriorated due to resource compression or the like by another line, the reception unit 141 receives a change request for changing an allocated resource of the user, from the manager of the communication line or the server managing information related to the use terminal of the communication line.

When the reception unit 141 receives the change request, the change unit 142 uses a predetermined change method to change the allocated resource of the user who has received the change request. For example, the change unit 142 changes the allocated resource of the user who has received the change request, by changing the accommodation position of the line of the user who has received the change request. The change unit 142 also changes the allocated resource of the user who has received the change request, by changing the accommodation position of the line of a user other than the user who has received the change request.

The change unit 142 also changes the allocated resource of the user who has received the change request, by changing the communication quality of the line of the user who has received the change request. Here, changing the communication quality of the user line means, for example, changing the setting of QoS (Quality of Service) for the communication of the user and enhancing the resource of the set line.

When the reception unit 141 receives the change request, the change unit 142 uses a predetermined change method to change the allocated resource of the user who has received the change request on the basis of the information related to the use terminal of the communication line that is received by the cooperation unit 143. For example, when a change request for changing an allocated resource of a user who uses the communication line is received from the user, the change unit 142 changes the allocated resource of the user, on the basis of subscriber information of an overlay network that is received by the cooperation unit 143 as described hereinafter.

That is, when the cooperation unit 143 receives information on a user having a large number of terminals related to the overlay network, the change unit 142 changes the allocated resource of the corresponding user by means of a change method 1. When shortage of resources is predicted by an event or the like from the information received by the cooperation unit 143, the allocated resource of the corresponding user is changed by a change method 3 in advance. Details of the change processing will be described hereinafter.

The cooperation unit 143 receives information on the use terminal of the communication line, from a server managing information related to the use terminal of the communication line. For example, the cooperation unit 143 receives information on the number of terminals used and the attribute of a service used, from a server managing information on the terminals used of the overlay network. Here, the service used is a service related to a video conference system, AR (Augmented Reality), VR (Virtual Reality), and the like, but is not particularly limited.

The acquisition unit 144 acquires user contract information from the manager of the communication line. The collection unit 145 collects statistical information of communication for each user (user statistical information) from the communication device. The scoring unit 146 scores the degree of influence of each user accompanying a change in the allocated resource by using the user contract information and the statistical information. Details of the scoring processing will be described hereinafter.

The storage unit 15 stores various information referred to when the control unit 14 operates, and various information acquired when the control unit 14 operates. The storage unit 15 includes a user contract information storage unit 151, a user communication statistical information storage unit 152, and a scoring information storage unit 153. Examples of the storage unit 15 include a semiconductor memory device such as a RAM (Random Access Memory) or a flash memory, and a storage device such as a hard disk or an optical disk. Note that the storage unit 15 is installed inside the management device 10 in the example shown in FIG. 1, but may be installed outside the management device 10. A plurality of storage units may be installed.

Figure 2:
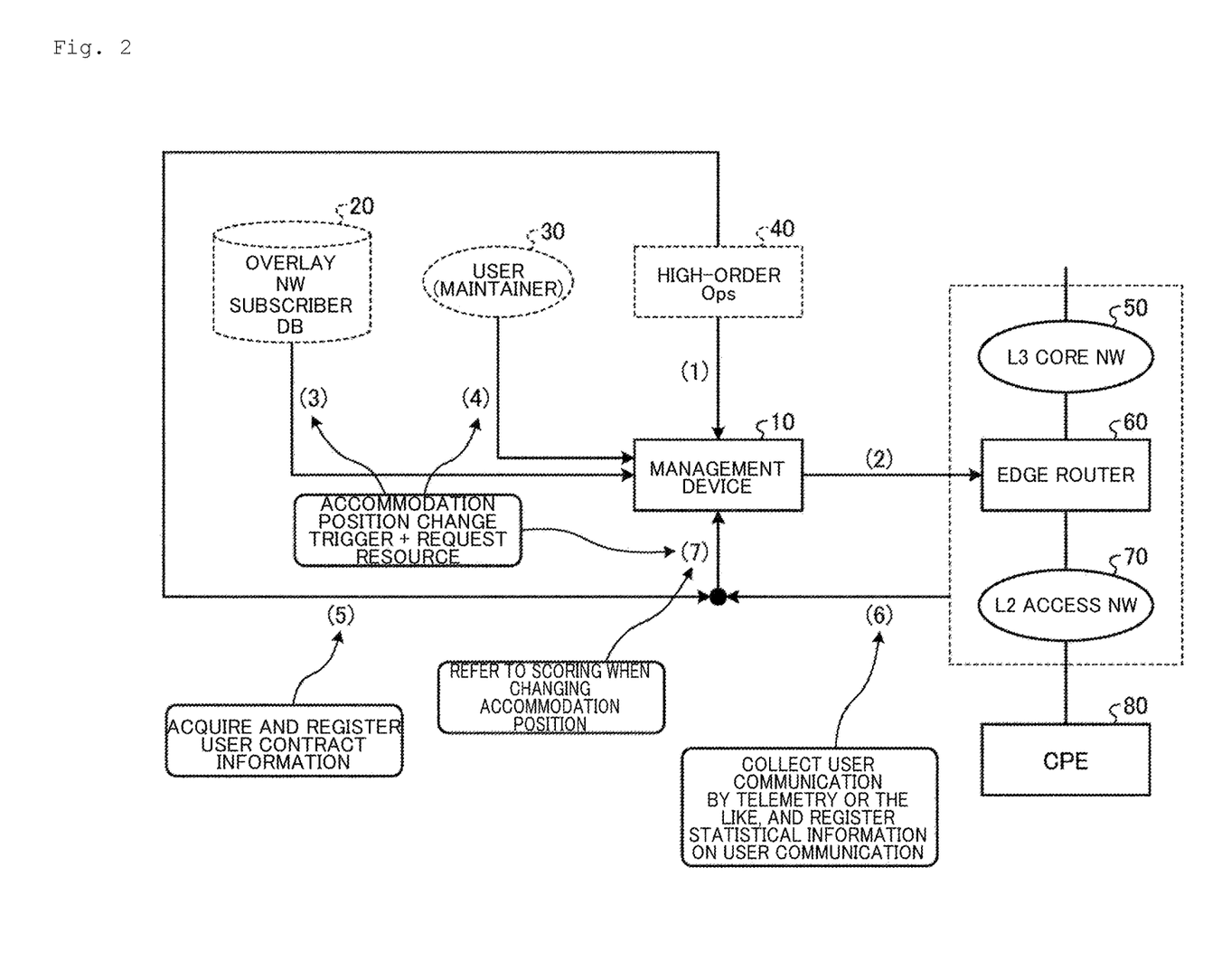
FIG. 2 is a diagram showing an example of a flow of processing performed in the management device according to the first embodiment.

Next, a flow of processing by the management device 10 according to the present embodiment will be described with reference to FIG. 2. FIG. 2 is a diagram showing an example of the flow of processing performed in the management device according to the first embodiment. The management device 10 according to the present embodiment has a function of receiving a report from a user or the like and changing a resource allocated to a target user on-demand on the basis of the report. The management device 10 also has a function of working with the server managing information and the like of the terminals used of the overlay network, to secure resources in consideration of the information. The management device 10 also has a function of acquiring the user contract information, a function of collecting user communication to acquire the statistical information, and a function of scoring the degree of influence accompanying a change in the accommodation position or the like for each user from the information.

First, at the time of service application for a communication line, at the time of maintenance work, or at the time of failure, for example, a user configuration input request is received from a high-order Ops (Operations System) 40, which is a server of a manager of the communication line, or the like (see (1) of FIG. 2).

Then, the change unit 142 of the management device 10 performs static resource allocation processing on an edge router 60. That is, on the basis of a policy of resource allocation determined in a network designing stage, the change unit 142 selects a communication device and a LAG port of an appropriate accommodation destination, input a configuration, accommodates a user line, and secure resources between communication devices (see (2) of FIG. 2) The edge router 60 is connected to a CPE (Customer Premises Equipment) 80 via an L3 (layer 3) core NW (Network) 5 or an L2 (layer 2) access NW 70 in FIG. 2, but is not particularly limited.

Also, the change unit 142 of the management device 10 performs dynamic resource allocation processing on the edge router 60. That is, when the reception unit 141 receives a change request for changing the allocated resource from a user 30 or the like using the communication line, the change unit 142, triggered by the change request, performs change processing for changing the allocated resource to the allocated resource (see (4) of FIG. 2)

Further, when the reception unit 141 receives a change request for changing the allocated resource from a server managing subscriber information of the overlay network, the server being a server managing information related to the terminals used of the communication line, the cooperation unit 143 acquires the subscriber information from an overlay NW subscriber DB (Database) 20 in which the subscriber information is stored, and the change unit 142 performs change processing for changing the allocated resource, on the basis of the information (see (3) of FIG. 2).

On the other hand, the scoring unit 146 of the management device 10 scores the degree of influence accompanying user line reaccommodation for each user in the allocation processing performed by the change unit 142. In so doing, the acquisition unit 144 acquires contract information of a user who uses the communication line from the high-order Ops 40, and registers the contract information in the user contract information storage unit 151 as user contract information (see (5) of FIG. 2).

Also, the collection unit 145 collects information on communication for each user by telemetry or the like from a communication device such as the edge router 60, and registers the information in the user communication statistical information storage unit 152 as user communication statistical information (see (6) of FIG. 2).

Then, the scoring unit 146 calculates the degree of influence accompanying the reaccommodation from the user contract information and the user communication statistical information, and registers the degree of influence in the scoring information storage unit 153 as scoring information. Finally, the change unit 142 refers to the scoring information, and performs the change processing for changing the allocated resource on the basis of the information (see (7) of FIG. 2).

Allocated Resource Change Processing

Figure 3:
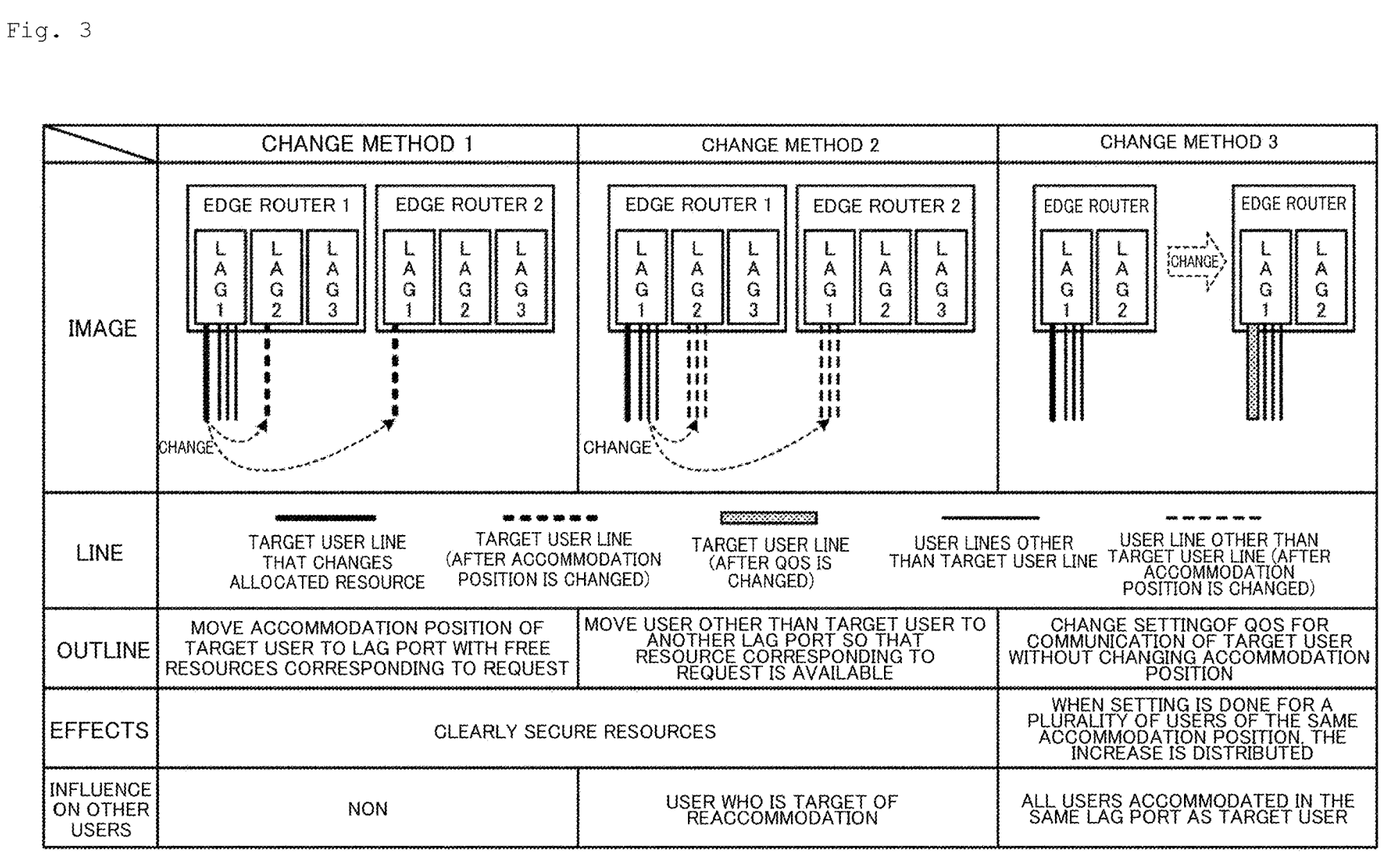
FIG. 3 is a diagram showing details of each change method according to the first embodiment.
Figure 4:
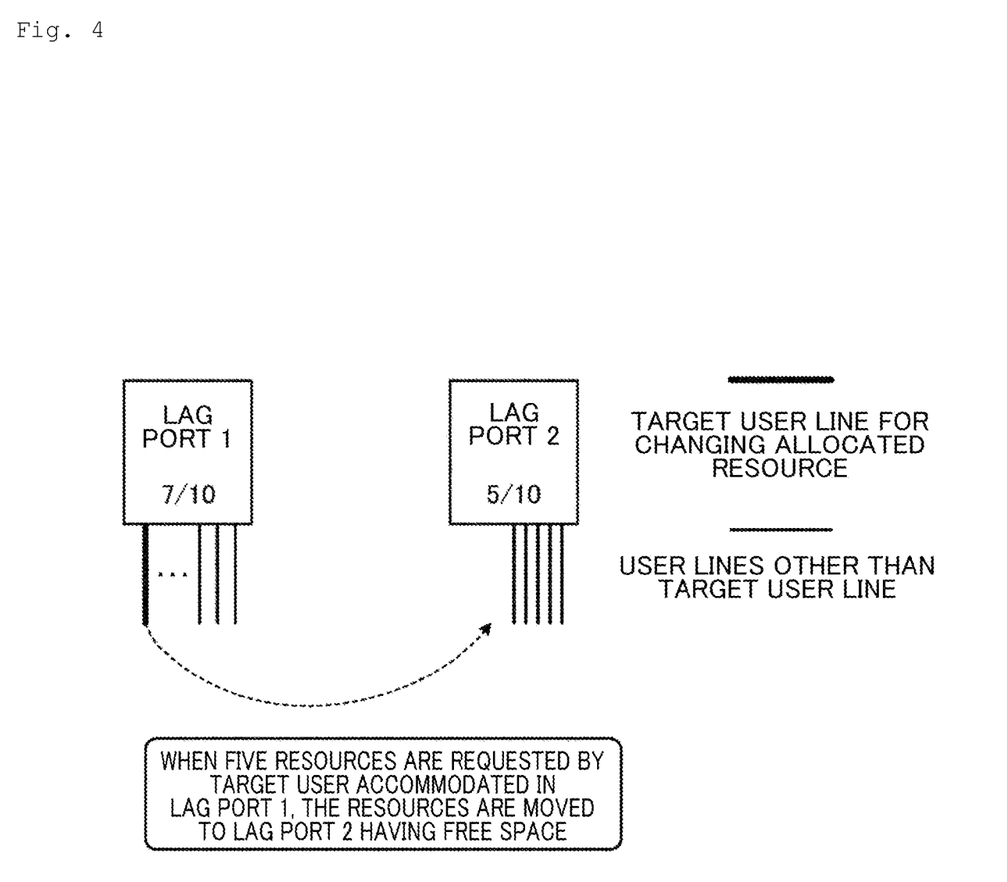
FIG. 4 is a diagram showing an example of change processing according to the first embodiment.
Figure 5:
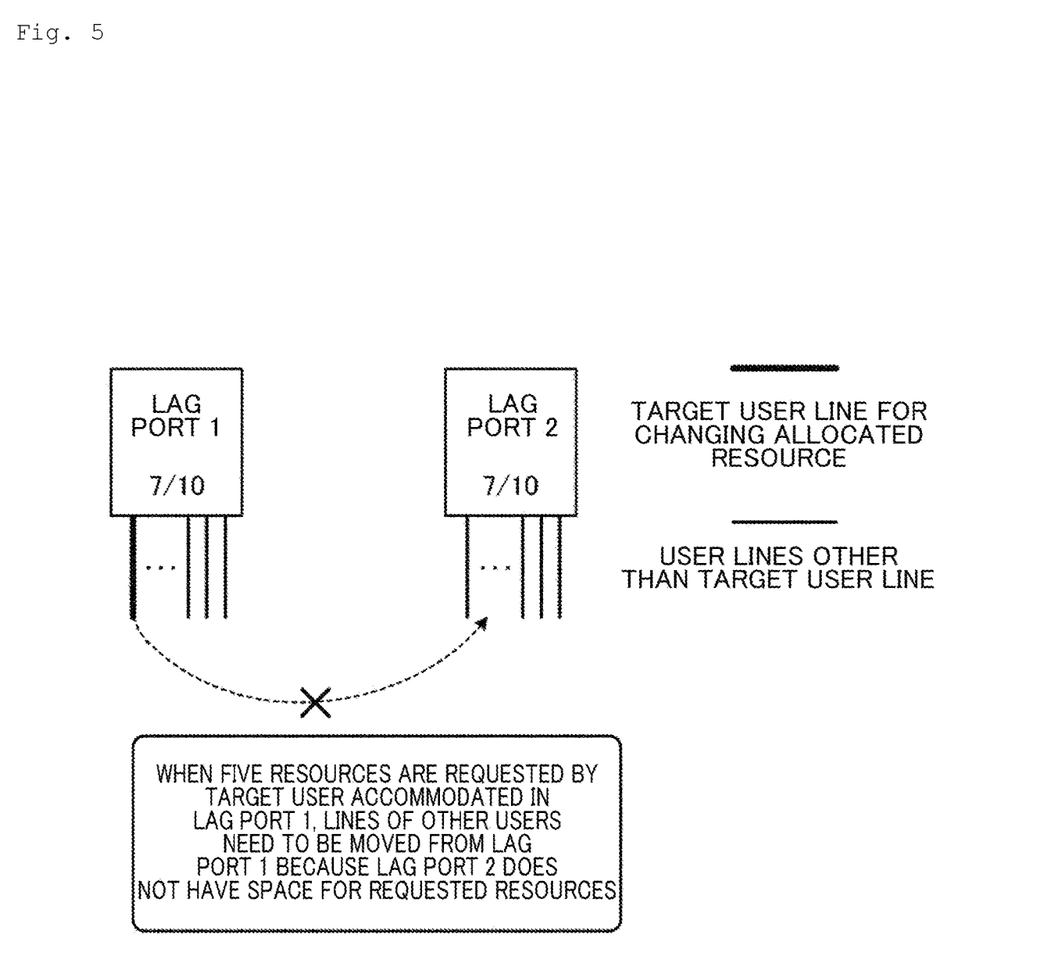
FIG. 5 is a diagram showing an example of the change processing according to the first embodiment.

The allocated resource change processing according to the present embodiment will be described in detail with reference to FIG. 3 and FIG. 5. FIG. 3 is a diagram showing details of each change method according to the first embodiment. FIG. 4 and FIG. 5 are each a diagram showing an example of the change processing according to the first embodiment. The method of the allocated resource change processing according to the present embodiment includes a change method 1, a change method 2, and a change method 3.

Embodiment 2

In the change method 1, the change unit 142 moves the accommodation position of the user who received an allocated resource change request (target user) to an edge router or a LAG port with free resources corresponding to the request. In so doing, a resource is clearly secured, and users other than the target user (other users) are not affected (see the change method 1 in FIG. 3).

For example, in FIG. 3, the line of the target user is accommodated in a LAG 1 of an edge router 1 prior to the change, but by the change processing by the change method 1 accommodates the line of the target user in a LAG 2 of the edge router 1 or a LAG 1 of an edge router 2 after the change (see the change method 1 in FIG. 3).

In the change method 2, the change unit 142 moves the accommodation position of another user to another edge router or another LAG port so that resources corresponding to the request become available. In so doing, a resource is clearly secured, and another use who was subjected to the reaccommodation is affected (see the change method 2 in FIG. 3).

For example, in FIG. 3, the line of the target user and the line of the other user are accommodated in the LAG 1 of the edge router 1 prior to the change, but the change processing by the change method 2 accommodates the line of the other user in a LAG 2 of the edge router 1 or the LAG 1 of the edge router 2 after the change, and the accommodation position of the line of the target user is not changed (see the change method 2 in FIG. 3).

Also, the change method 1 and the change method 2 can be used in combination. For example, in FIG. 4, the line of the target user is accommodated in a LAG port 1, and seven resources out of 10 available resources are used for the LAG port 1. On the other hand, five resources out of 10 available resources are used for a LAG port 2. When five resources are requested by the target user, the LAG port 1 cannot accommodate the requested resources, but the LAG port 2 can accommodate the requested resources. Therefore, it is preferred that the change processing of the change method 1 move the line of the target user to the LAG port 2 (see FIG. 4).

On the other hand, in FIG. 5, as with FIG. 4, the line of the target user is accommodated in the LAG port 1, and seven resources out of 10 available resources are used for the LAG port 1. On the other hand, unlike FIG. 4, seven resources out of 10 available resources are used for the LAG port 2. When five resources are requested by the target user, neither the LAG port 1 nor the LAG port 2 can accommodate the requested resources. Therefore, it is preferred that the change processing by the change method 2 move the line of the other user of the LAG port 1 to the LAG port 2 (see FIG. 5).

In the change method 3, the change unit 142 changes QoS setting for communication of the target user without changing the accommodation position of the user. At this time, when QoS is set for a plurality of users of the same accommodation position, the increased resources are distributed to the plurality of users. That is, all users accommodated on the same LAG port as the target user are affected by the change in allocated resources (see the change method 3 in FIG. 3).

For example, in FIG. 3, the line of the target user is accommodated in the LAG 1 of the edge router, but the change processing of the change method 3 enhances the allocated resources without changing the accommodation position after the change. (See the change method 3 in FIG. 3).

Scoring Processing

Figure 6:
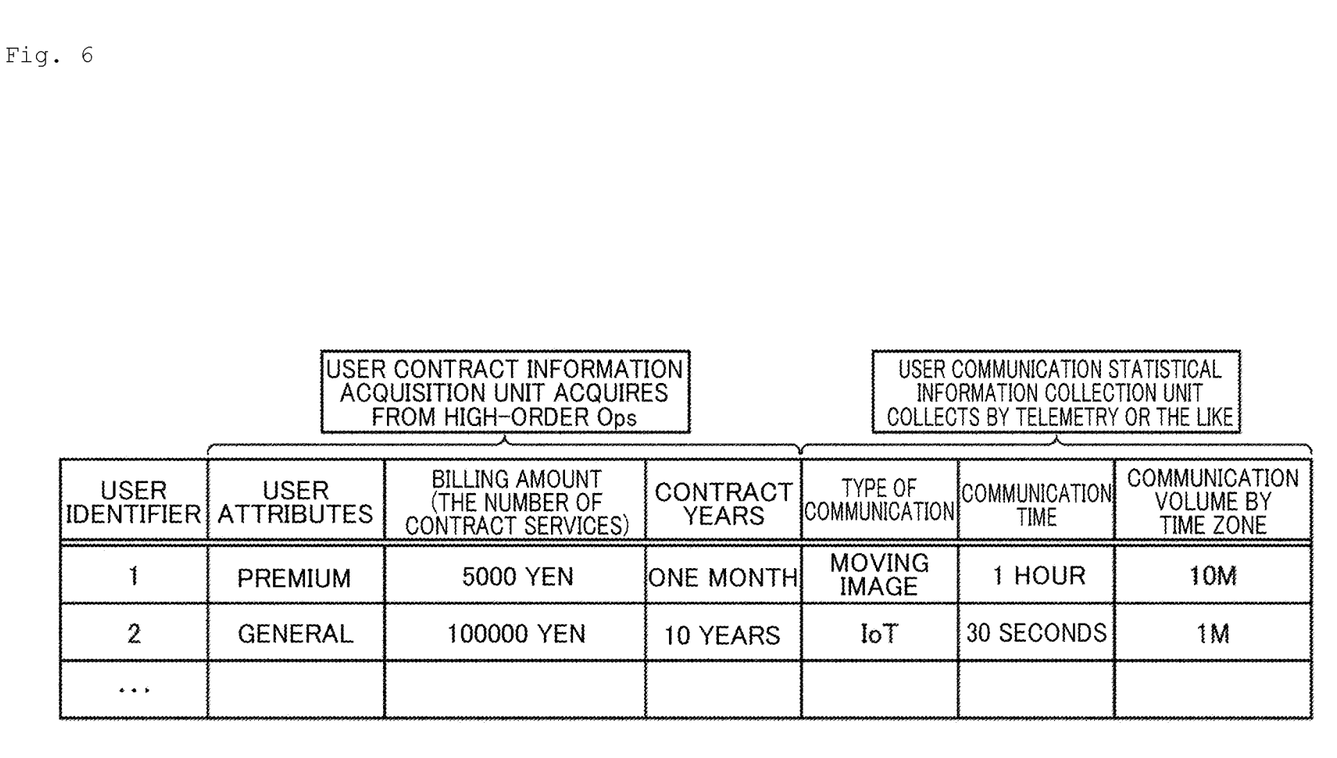
FIG. 6 is a diagram showing an example of user contract information and user communication statistical information according to the first embodiment.

The scoring processing according to the present embodiment will be described in detail with reference to FIG. 6. FIG. 6 is a diagram showing an example of the user contract information and the user communication statistical information according to the first embodiment. In FIG. 6, examples of the user contract information corresponding to user identifiers include user attributes, billing amounts (number of contract services), and contract years, and examples of the user communication statistical information corresponding to user identifiers include communication types, communication time, and communication volumes by time zone.

First, the acquisition unit 144 acquires the user contract information from the high-order Ops 40, which is a server of a manager of a communication line, and stores the user contract information in the user contract information storage unit 151. The user contract information here includes, as shown in FIG. 6, a user attribute, a billing amount (the number of contract services), contract years and the like for each user, but is not particularly limited. The user contract information may be acquired from anywhere other than the high-order Ops 40, such as from the overlay NW subscriber DB 20 or a user 30.

The collection unit 145 collects user communication statistical information from the communication device by telemetry or the like, and stores the user communication statistical information in the user communication statistical information storage unit 152. Here, the user communication statistical information includes, as shown in FIG. 6, a communication type, communication time, a communication volume by time zone and the like for each user, but is not particularly limited. In addition, the communication device from which the user communication statistical information is collected is the L3 core NW 50, the edge router 60, the L2 access NW 70 or the like, but is not particularly limited.

Then, the scoring unit 146 refers to the user contract information and the user communication statistical information, calculates scoring information, and stores the scoring information in the scoring information storage unit 153. Here, the scoring information is the degree of influence or the like accompanying reaccommodation of a resource for each user, which is calculated by using the user contract information or the user communication statistical information. The scoring information is calculated as follows and used for changing the accommodation position of a user.

For example, when a user with less contract years and billing amount is the target of changing the accommodation position, the scoring unit 146 increases a weight W1 of the contract year parameter and a weight W2 of the billing amount parameter, takes a numerical value obtained by summing the product of the contract years and W1 and the product of the billing amount and W2 as scoring information, and creates a list by sorting the numerical values in the order of the smaller scoring information. When selecting a user as the target of reaccommodation, the change unit 142 selects the user at the top of the list, that is, selects said user starting from a user having a small numerical value.

The scoring unit 146 sets a weight corresponding to a communication type and a communication volume when a user having little influence of communication interruption is the target of changing the accommodation position. For example, when it is assumed that a moving image is hardly affected by communication interruption due to a buffer or the like, the weight of the moving image of the communication type is set small, the calculated numerical values are taken as scoring information, and a list is created by sorting the calculated numerical values in the order of the small scoring information. When selecting a user as the target of reaccommodation, the change unit 142 selects the user at the top of the list, that is, selects said user starting from a user having a small numerical value.

The scoring processing described above is performed when changing the allocated resource by means of the change method 2, but is not particularly limited. The scoring unit 146 can perform the scoring processing described above even when changing the allocated resource by means of the change method 1 or the change method 3. Similarly, even when changing the allocated resource by means of the change method 1 or the change method 3, the change unit 142 can refer to the scoring information and perform the change processing for changing the allocated resource.

Procedure of Management Processing

Figure 7:
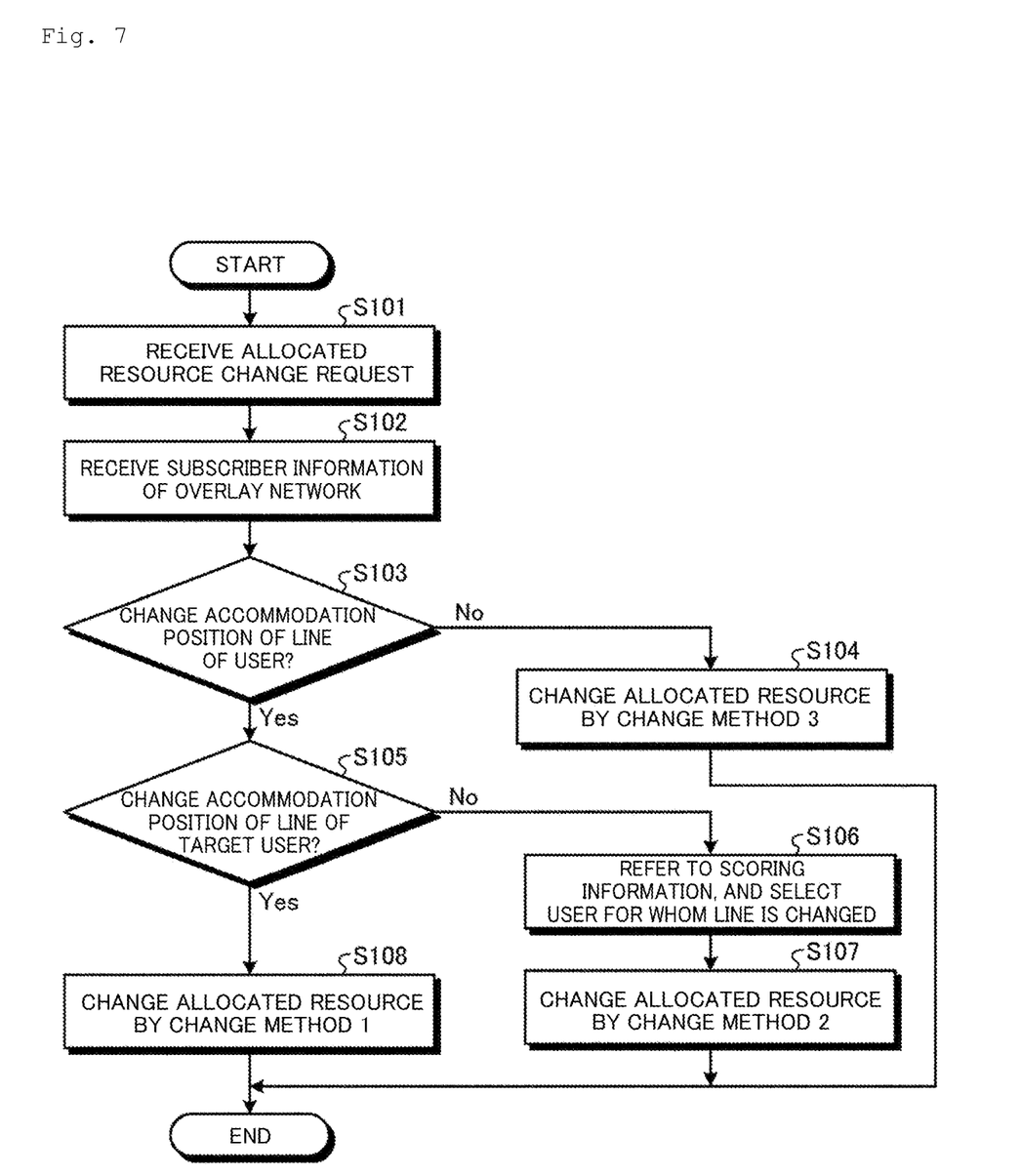
FIG. 7 is a flowchart showing an example of a flow of management processing according to the first embodiment.

An example of a procedure of the management processing according to the present embodiment will be described with reference to FIG. 7. FIG. 7 is a flowchart showing an example of a flow of the management processing according to the first embodiment. First, as shown in FIG. 7, the reception unit 141 of the control unit 14 accepts a change request for changing an allocated resource of a user, from the high-order Ops 40, the server managing subscriber information of the overlay network, the user 30, or the like (step S101).

Next, the cooperation unit 143 of the control unit 14 accepts subscriber information of the overlay network from the overlay NW subscriber DB 20 (step S102). The processing of step S102 is executed after step S101, but the processing of step S101 and the processing of step S102 may be executed at the same time, or the processing of step S101 may be executed after step S102. In addition, the processing of steps S101 may be omitted.

Subsequently, in steps S103 to S108, the change unit 142 of the control unit 14 determines a change method for changing the allocated resource, and performs the change processing. In so doing, the determined change method may be a method designated in advance when the reception unit 141 accepted a change request for changing an allocated resource of a user. The determined change method may be a method that is determined by the change unit 142 on the basis of the subscriber information of the overlay network received by the cooperation unit 143, the scoring information referred to by the change unit 142, and the like.

When the change method for changing an allocated resource does not change the accommodation position of a line of any user (step S103, negative), the change unit 142 changes the allocated resource by means of the change method 3 (step S104), and the processing is ended.

When the allocated resource change method changes the accommodation position of the line of any of the users (step S103, positive) but does not change the accommodation position of the line of the target user (step S105, negative), the change unit 142 refers to the scoring information in the scoring information storage unit 153, selects a user for whom the accommodation position of the line is changed (step S106), and changes the allocated resource by the change method 2 (step S107), whereby the processing is ended.

Note that although the processing of step S107 is performed after step S106 in FIG. 7, the processing of step S106 and the processing of step S107 may be performed at the same time. Also, the processing of S106 may be omitted.

When the allocated resource change method changes the accommodation position of the line of any of the users (step S103, positive) and changes the accommodation position of the line of the target user (step S105, positive), the change unit 142 changes the allocated resource by the change method 1 (step S108), whereby the processing is ended.

Effects of First Embodiment

In the management device according to the present embodiment described above, a change request for changing an allocated resource of a user who uses a communication line is received from a manager of the communication line, a server managing information related to a use terminal of the communication line, or the user, and when the change request for changing the allocated resource of the user is received, the allocated resource of the user is changed by using a predetermined change method. Therefore, the management device according to the present embodiment can change the resource allocated to the user in the communication line, flexibly and on-demand.

In addition, the management device according to the present embodiment further receives information related to the use terminal from the server managing information related to the use terminal of the communication line, and when a change request for changing an allocated resource of a user is received, the allocated resource of the user is changed using a predetermined change method on the basis of the received information on the use terminal. Therefore, in the management device according to the present embodiment, a flexible resource can be allocated to a user in accordance with changes in information on use terminals such as the number and attributes of the use terminals, instead of in units of lines.

In the management device according to the present embodiment, user contract information is acquired from a manager of a communication line, statistical information of communication for each user is collected from a communication device, and the degree of influence for each user accompanying a change of an allocated resource is scored by using the user contract information and the statistical information. Thus, an allocated resource of a user can be changed on-demand while suppressing the influence on a user other than the target user.

System Configuration Etc

Each component of each illustrated device according to the foregoing embodiment is a functional concept and does not necessarily have to be physically configured as shown in the diagrams That is, the specific forms of distribution and integration of the devices are not limited to the forms illustrated in the diagrams, and all or part of them can be configured by functionally or physically distributing and integrating them in any unit according to various loads and use situations. Furthermore, all or any part of the processing functions performed by the devices may be implemented by a CPU (Central Processing Unit) and a program that is analyzed and executed by the CPU, or may be implemented as hardware using wired logic.

Also, out of the pieces of processing described in the present embodiment above, all or some of them that are described as being automatically executed may also be manually executed, or all or some steps of them that are described as being manually executed may also be automatically executed using a known method. In addition, information including the processing procedure, control procedure, specific name, various data and parameters that are shown in the above documents and drawings may be arbitrarily changed unless otherwise described.

Program

It is also possible to create a program that describes processing executed by the management device 10 described in the foregoing embodiment, in a computer-executable language. In this case, the same effects as those in the foregoing embodiment can be achieved by a computer executing the program. Furthermore, processing similar to that of the foregoing embodiment may be also realized by recording the program in a computer-readable recording medium and causing a computer to load and execute the program recorded in this recording medium.

Figure 8:
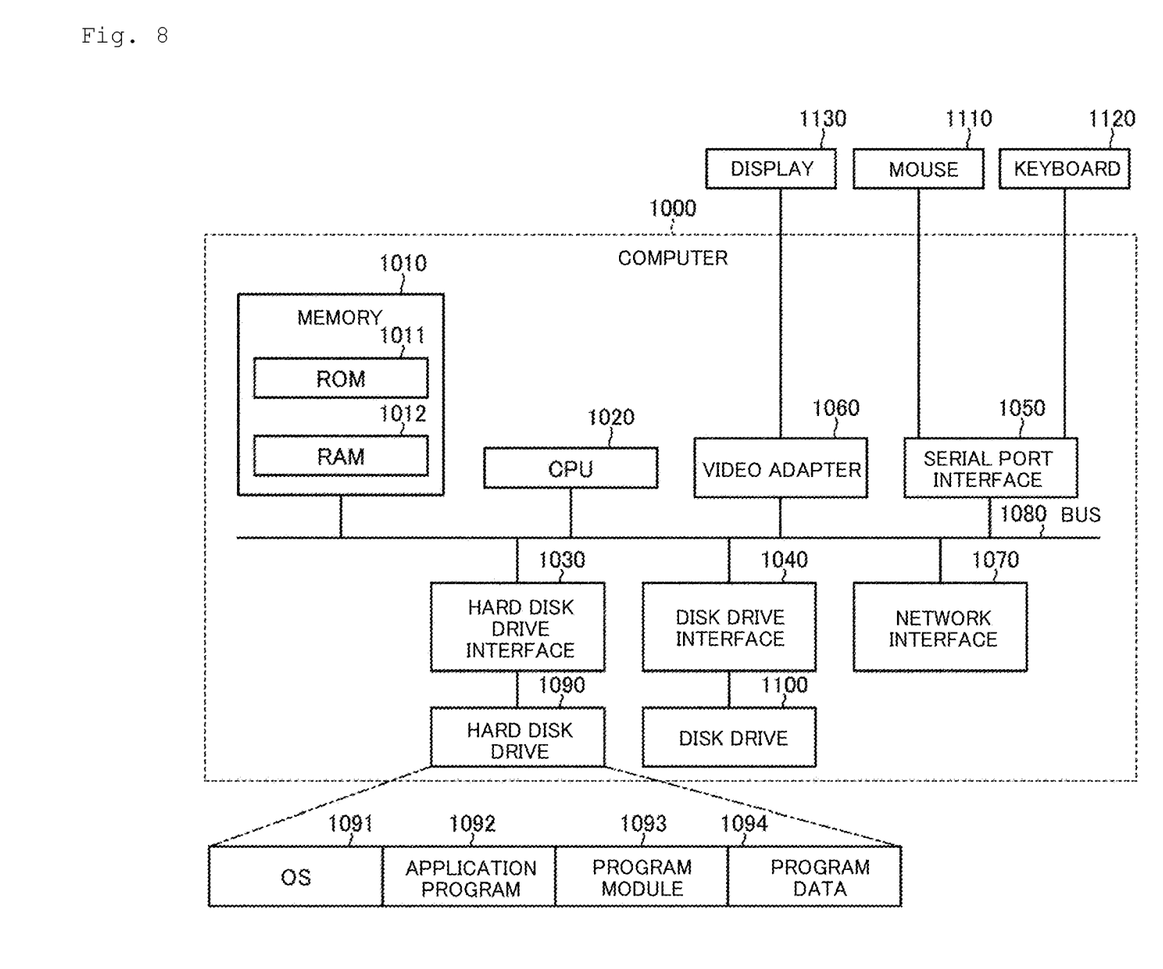
FIG. 8 is a diagram showing a computer that executes a program.

FIG. 8 illustrates a computer that performs a program. As exemplified in FIG. 8, a computer 1000 includes, for example, a memory 1010, a CPU 1020, a hard-disk drive interface 1030, a disk drive interface 1040, a serial port interface 1050, a video adapter 1060, and a network interface 1070, and these units are connected to each other via a bus 1080.

As illustrated in FIG. 8, the memory 1010 includes a ROM (Read Only Memory) 1011 and a RAM 1012. The ROM 1011 stores, for example, a boot program such as a BIOS (Basic Input Output System). As illustrated in FIG. 8, the hard disk drive interface 1030 is connected to a hard disk drive 1090. As illustrated in FIG. 8, the disk drive interface 1040 is connected to a disk drive 1100. For example, a removable storage medium such as a magnetic disk or an optical disk is inserted in the disk drive 1100. As illustrated in FIG. 8, the serial port interface 1050 is connected to a mouse 1110 and a keyboard 1120, for example. As illustrated in FIG. 8, the video adapter 1060 is connected to, for example, a display 1130.

Here, as illustrated in FIG. 8, the hard disk drive 1090 stores, for example, an OS 1091, an application program 1092, a program module 1093, and program data 1094. That is, the program described above is stored in, for example, the hard disk drive 1090 as a program module containing instructions to be executed by the computer 1000.

Also, various types of data described in the foregoing embodiments may be stored, as program data, in the memory 1010 or the hard disk drive 1090, for example. Also, the CPU 1020 reads the program module 1093 or program data 1094 stored in the memory 1010 or the hard disk drive 1090 onto the RAM 1012 as needed, and executes various processing procedures.

Note that the program module 1093 and the program data 1094 related to the program need not be stored in the hard disk drive 1090, and may also be stored in, for example, a removable storage medium and loaded by the CPU 1020 via a disk drive or the like. Alternatively, the program module 1093 and the program data 1094 related to the program may also be stored in another computer that is connected via a network (a LAN (Local Area Network), a WAN (Wide Area Network), or the like) and loaded by the CPU 1020 via the network interface 1070.

The above embodiments and variations thereof are included within the scope of the claimed invention and its equivalents as well as within the technology disclosed by the present application.

REFERENCE SIGNS LIST

10 Management device
11 Input unit
12 Output unit
13 Communication unit
14 Control unit
141 Reception unit
142 Change unit
143 Linkage unit
144 Acquisition unit
145 Collection unit
146 Scoring unit
15 Storage unit
151 User contract information storage unit
152 User communication statistical information storage unit
153 Scoring information storage unit
20 Overlay NW subscriber DB
30 User (maintainer)
40 High-order Ops
50 L3 core NW
60 Edge router
70 L2 access NW
80 CPE

The invention claimed is:

1. A management device, comprising:
a receiver configured to receive, from an operation system, a change request for changing an allocated resource of a user account using a communication line; and
a change unit, implemented using one or more computing devices, configured to, based on the change request being received by the receiver, change the allocated resource of the user account by using a predetermined change method,
wherein the change unit is configured to, based on the predetermined change method changing (i) an accommodation position of a line of any user account and (ii) an accommodation position of a line of the user account for which the change request is received, change the allocated resource of the user account using a first change method, which includes changing the accommodation position of the line of the user account for which the change request is received,
wherein the change unit is configured to, based on the predetermined change method (i) changing the accommodation position of the line of any user account and (ii) not changing the accommodation position of the line of the user account for which the change request is received, change the allocated resource of the user account using a second change method, which includes selecting a user account other than the user account for which the change request is received according to scoring information and changing an accommodation position of a line of the selected user account, and
wherein the change unit is configured to, based on the predetermined change method not changing the accommodation position of the line of any user account, change the allocated resource of the user account using a third change method, which includes changing communication quality of the line of the user account for which the change request is received.

2. The management device according to claim 1, further comprising:
a cooperation unit, implemented using one or more computing devices, configured to receive, from a server, information related to a terminal,
wherein, based on the change request being received by receiver, the change unit is configured to change the allocated resource of the user account by using the predetermined change method based on the information related to the terminal received by the cooperation unit.

3. The management device according to claim 1, further comprising:
an acquisition unit, implemented using one or more computing devices, configured to acquire user contract information from a managing device;
a collection unit, implemented using one or more computing devices, configured to collect statistical information regarding communication of each user account from a communication device; and
a scoring unit, implemented using one or more computing devices, configured to determine a degree of influence of each user account accompanying a change in the allocated resource by using the user contract information and the statistical information,
wherein the determined degree of influence is defined as the scoring information.

4. A management method, comprising:
receiving, from an operation system, a change request for changing an allocated resource of a user account using a communication line; and
based on the change request being received, changing the allocated resource of the user account by using a predetermined change method,
wherein changing the allocated resources comprises:
based on the predetermined change method changing (i) an accommodation position of a line of any user account and (ii) an accommodation position of a line of the user account for which the change request is received, changing the allocated resource of the user account using a first change method, which includes changing the accommodation position of the line of the user account for which the change request is received,
based on the predetermined change method (i) changing the accommodation position of the line of any user account and (ii) not changing the accommodation position of the line of the user account for which the change request is received, changing the allocated resource of the user account using a second change method, which includes selecting a user account other than the user account for which the change request is received according to scoring information and changing an accommodation position of a line of the selected user account, and
based on the predetermined change method not changing the accommodation position of the line of any user account, changing the allocated resource of the user account using a third change method, which includes changing communication quality of the line of the user account for which the change request is received.

5. The management method according to claim 4, further comprising:
receiving, from a server, information related to a terminal,
based on the change request being received, changing the allocated resource of the user account by using the predetermined change method based on-on the basis of the received information related to the terminal.

6. The management method according to claim 4, further comprising:
acquiring user contract information from a managing device;
collecting statistical information regarding communication of each user account from a communication device; and
determining a degree of influence of each user account accompanying a change in the allocated resource by using the user contract information and the statistical information,
wherein the determined degree of influence is defined as the scoring information.

7. A non-transitory computer recording medium storing a management program, wherein executing of the management program causes a computer to perform operations comprising:
receiving, from an operation system, a change request for changing an allocated resource of a user account using a communication line; and
based on the change request being received, changing the allocated resource of the user account by using a predetermined change method,
wherein changing the allocated resources comprises:
based on the predetermined change method changing (i) an accommodation position of a line of any user account and (ii) an accommodation position of a line of the user account for which the change request is received, changing the allocated resource of the user account using a first change method, which includes changing the accommodation position of the line of the user account for which the change request is received,
based on the predetermined change method (i) changing the accommodation position of the line of any user account and (ii) not changing the accommodation position of the line of the user account for which the change request is received, changing the allocated resource of the user account using a second change method, which includes selecting a user account other than the user account for which the change request is received according to scoring information and changing an accommodation position of a line of the selected user account, and
based on the predetermined change method not changing the accommodation position of the line of any user account, changing the allocated resource of the user account using a third change method, which includes changing communication quality of the line of the user account for which the change request is received.

8. The non-transitory computer recording medium according to claim 7, wherein the operations further comprise:
receiving, from a server, information related to a terminal,
based on the change request being received, changing the allocated resource of the user account by using the predetermined change method based on the received information related to the terminal.

9. The non-transitory computer recording medium according to claim 7, wherein the operations further comprise:
acquiring user contract information from a managing device;
collecting statistical information regarding communication of each user account from a communication device; and
determining a degree of influence of each user account accompanying a change in the allocated resource by using the user contract information and the statistical information,
wherein the determined degree of influence is defined as the scoring information.

* * * * *